United States Patent Office 3,347,689
Patented Oct. 17, 1967

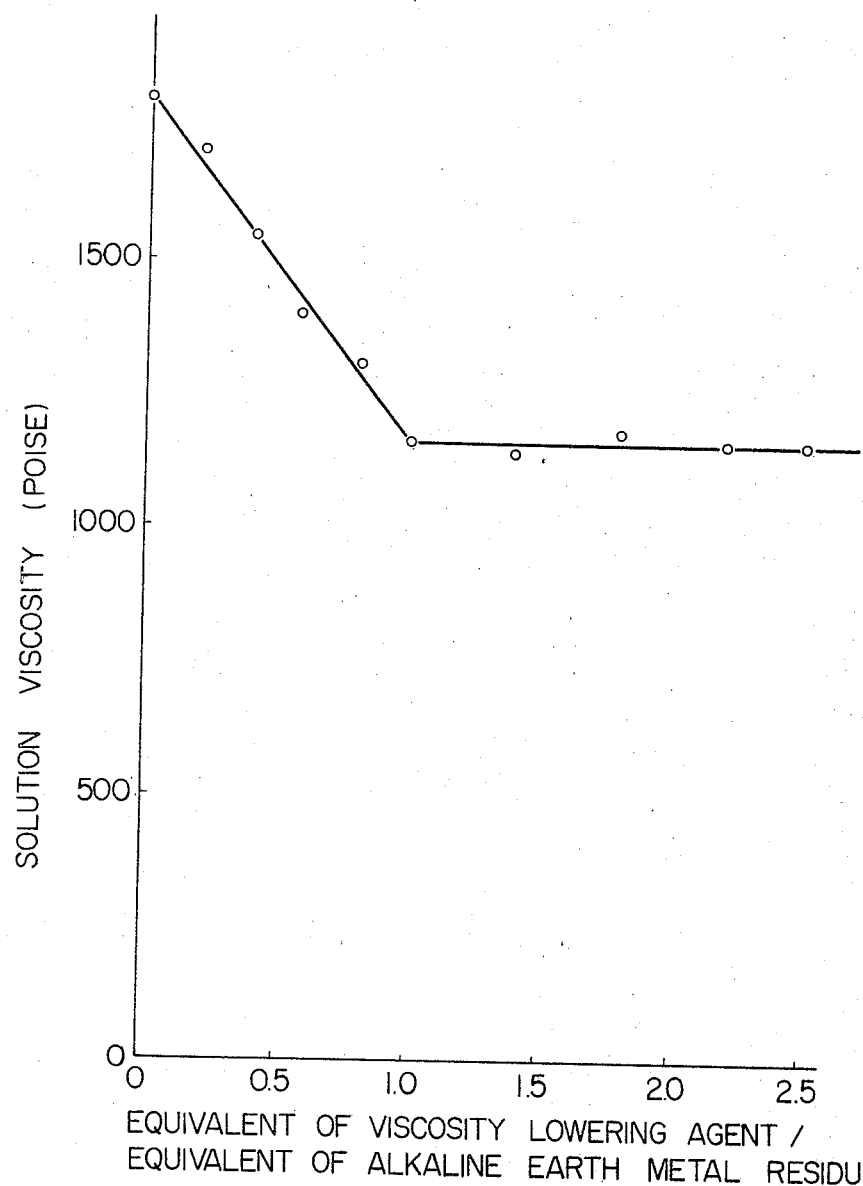

3,347,689
METHOD OF REDUCING THE VISCOSITY OF A SOLUTION OF CELLULOSE DERIVATIVE
Atsushi Futami and Kazushige Hayashi, Matsuyama-shi, Japan, assignors to Teijin Limited, Osaka, Japan, a corporation of Japan
Filed Aug. 2, 1965, Ser. No. 476,636
Claims priority, application Japan, Aug. 24, 1961, 36/30,683; May 8, 1962, 37/17,861; May 24, 1962, 37/20,495; May 28, 1962, 37/21,066
1 Claim. (Cl. 106—178)

This invention relates to a method of reducing the viscosity of a solution of a cellulose derivative polymer, and to improved polymer solutions thereby obtained.

The manufacture of filaments, films and other shaped articles by solution spinning or solution casting of celluose derivative polymer solutions, is widely practised. For the purpose of obtaining the desirable properties in the final product or for reducing the expenses that are incurred in the manufacturing process in such solution shaping operations, many proposals have been made, such as raising the degree of polymerization of the cellulose derivative, raising the concentration of the solution, or changing the composition of the solution. In practice it has been found in certain types of polymer solutions that the viscosity is increased markedly by the alkaline earth metals when present in minute quantities in the solution. This phenomenon is commonly referred to as the "salt effect."

Although there is as yet no established theory as regards the precise mechanism of salt effect, it is believed that the abnormally high viscosity of a cellulose derivative solution containing alkaline earth metal salts results from the formation of cross-linking bonds between the chains of the polymer molecules by the ion bonding of the alkaline earth metals to the ionizable group in the polymer and/or the formation of a certain kind of cross-linking bond by the dissolved alkaline earth metals by being absorbed to the chain of the polymer molecule. With such polymer solutions, the viscosity becomes so high as to be unsuitable for ordinary processing.

In order to eliminate the abnormally high viscosity of the polymer solution due to salt effect, it has hitherto been the usual practice to remove by means of washing as much as possible of the alkaline earth metal salts which are the cause of salt effect. However, to remove completely the alkaline earth metal salts is not only very difficult from the technical as well as economic standpoint, but on occasions there is a lowering of the heat stability of the polymer product with the fall in the content of the alkaline earth metal salts.

Thus with acetone solutions of acetyl cellulose, the addition of a small amount of water to the solution to lower the solution viscosity has been practised. However, it has been found that the addition of non-solvent such as water results in a deterioration in the quality of the plastics or textile when formed into the final product. Another procedure whereby the content of the alkaline earth metal residue is reduced, is by washing the polymer in the presence of an alkaline metal acid phosphate or by the use of an alkyl substituted benzene sulphonate. However, the method of preparing the composition is troublesome, or the desired reduction in the viscosity is not always attained.

It has now been found that the viscosity of cellulose derivative solutions, displaying the "salt effect" may be reduced by the incorporation therein of certain acids, or of salts thereof, as hereinafter described, whereby the troublesome alkaline earth metal salts are transformed into substantially insoluble compounds, or into chelates, and the polymer solution thereby improved for subsequent processing into the final product. By the term "substantially insoluble" is meant a solubility of not more than 0.15 gram per 100 grams of solution, at 25° C.

This invention is a method of lowering the viscosity of a solution of a cellulose derivative which comprises adding to the solution of a cellulose derivative selected from the group consisting of cellulose nitrate, cellulose acetate, cellulose propionate, cellulose butyrate, cellulose acetate butyrate, methyl cellulose, ethyl cellulose, benzyl cellulose, carboxymethyl cellulose, hyroxyethyl cellulose and cyanoethyl cellulose, containing alkaline earth metal salts, therefore, having a higher solution viscosity than that of the corresponding solution not containing said alkaline earth metal salts, a viscosity-lowering agent selected from the group consisting of oxalic acid, maleic acid, malonic acid, ethyl malonic acid, salicylic acid, orthochlorobenzoic acid, picrolonic acid, ethylenediaminetetraacetic acid, nitrilotriacetic acid, and the alkali metal salts and ammonium salts thereof in an amount of 2–50 milligram equivalents based on 100 grams of the cellulose derivative.

The cellulose derivative solutions with which the present invention is concerned are those which manifest salt effect such as given hereinabove. The various commercially available cellulose derivatives such as cellulose nitrate, acetyl cellulose, cellulose propionate, cellulose butyrate, cellulose acetate butyrate, methyl cellulose, ethyl cellulose, benzyl cellulose, carboxymethyl cellulose, hydroxyethyl cellulose and cyanoethyl cellulose normally contain more than 2 milligram equivalents of alkaline earth metal salts based on 100 grams of the cellulose derivative. For instance, commercially available acetyl cellulose is relatively well purified, yet it contains alkaline earth metal salt in an amount of about 1.5–7.5 milligram equivalent based on 100 grams of the polymer. Because the existence of alkaline earth metal salts in an amount above 2 milligram equivalents based on 100 grams of the polymer brings about clear salt effect, almost all of commercially available acetyl cellulose shows salt effect corresponding to the alkaline earth metal salt content thereof. The purification degrees of the commercially available cellulose derivatives other than acetyl cellulose are relatively low, some of them containing about 50 milligram equivalents based on 100 grams of the polymers of alkaline earth metal salts. This invention is especially concerned with these cellulose derivative solutions containing 2–50 milligram equivalents of alkaline earth metal salts per 100 grams of the cellulose derivative and with the solution thereof containing about 5–60% by weight of the cellulose derivatives. The cellulose derivative solutions containing alkaline earth metal salts in amounts below 2 milligram equivalents per 100 grams of the polymers and the cellulose derivative solutions having polymer concentrations below about 5% by weight show only slight salt effects. Cellulose derivatives containing alkaline earth metal salts in amounts above 50 milligram equivalents per 100 grams of the polymers are not suitable for ordinary uses. Further, it is generally difficult for the cellulose derivative solutions having polymer concentrations above about 60% by weight to sufficiently appreciate the benefit of this invention.

Solvents for the aforesaid cellulose derivatives are well known. For instance, as solvents for cellulose nitrate whose nitrogen content is below about 11% by weight, there are lower alcohols such as methanol, ethanol and diacetone alcohol; mixtures of these lower alcohols and water; and mixtures of these lower alcohols and hydrocarbons such as benzene, toluene and xylene. On the other hand, as solvents for cellulose nitrate whose nitrogen content is about 11–12" by weight, there are, besides the aforesaid lower alcohols, esters such as methyl acetate, ethyl acetate, ethyl lactate and butyl glycolate; ethers such as diethyl ether, ethyl isobutyl ether and ethylene glycol methyl ether; ketones such as acetone, methyl ethyl ketone and cyclopentanone; a nitro compound of a hydrocarbon such as nitropropane and nitrobenzene; and mixtures thereof.

As solvents for cellulose acetate having an acid value of about 52–58%, there are ketones such as acetone, methyl ethyl ketone, cyclohexanone and 1,4-dioxane; esters such as methyl acetate, ethyl acetate, methoxyethyl acetate and ethoxyethyl acetate; alcohols such as diacetone alcohol; halogenated hydrocarbons such as methylene chloride, ethylene chloride, chloroform and carbon tetrachloride; nitro hydrocarbons such as nitromethane and nitropropane; mixture of acetone and water; mixture of acetone and lower alcohols such as methanol and ethanol; mixtures of said halogenated hydrocarbons and said lower alcohols; and mixtures thereof. As solvents for cellulose acetate having an acid value of about 58–60%, there are mixtures of said halogenated hydrocarbons and said lower alcohols; esters such as methyl acetate, ethyl acetate and methoxyethyl acetate; and mixture of nitromethane and ethanol. And as solvents for cellulose acetate having an acid value of about 60–62.5%, there are mixtures of said halogenated hydrocarbons and said lower alcohols.

As solvents for cellulose propionate, cellulose butyrate and cellulose acetate butyrate, there are ketones such as acetone, methyl ethyl ketone and cyclohexanone; esters such as methyl acetate, ethyl acetate and ethoxyethyl acetate; halogenated hydrocarbons such as methylene chloride, ethylene chloride and chloroform; mixtures of acetone and lower alcohols such as methanol and ethanol; mixtures of said lower alcohols and said esters; mixtures of said lower alcohols and said hydrocarbons; mixtures of said lower alcohols and hydrocarbons such as benzene and toluene; and mixtures thereof.

As solvents for methyl cellulose and ethyl cellulose, there are water, an aqueous solution of a caustic alkali, lower alcohols such as methanol and ethanol, hydrocarbons such as benzene and toluene, and mixtures thereof.

As solvents for benzyl cellulose, there are ketones such as cyclohexanone and methyl isobutyl ketone, esters such as ethyl acetate and ethoxyethyl acetate, hydrocarbons such as benzene and toluene, halogenated hydrocarbons such as methylene chloride and ethylene dichloride, mixtures of said hydrocarbons and lower alcohols such as methanol and ethanol, and mixtures thereof.

As solvents for carboxymethyl cellulose and hydroxyethyl cellulose, there are water and an aqueous solution of sodium hydroxide. The mixture of water and a lower alcohol or acetone is of use also.

As solvents for cyanoethyl cellulose, there are water, an aqueous solution of sodium hydroxide, ketone such as acetone and methyl ethyl ketone, esters like methyl formate, nitrogen compound such as acetonitrile, acrylonitrile, ethyl cyanoethyl ether and dimethyl formamide, and mixtures thereof.

The accompanying drawing represents graphically the relationship between the ratio of the equivalent of the viscosity-lowering agent to that of the alkaline earth metal salts and the viscosity of the solution (measured at 30° C. by the falling ball method) with respect to a solution which comprises a polymer solution (content of alkaline earth metal salts being 2.5 mg. equivalent) consisting of 25 parts of cellulose acetate butyrate, 74.5 parts of acetone and 0.5 part of water to which picrolonic acid in varying proportions has been added.

As is apparent from the graph, while the lowering of the viscosity takes place up to the point of equivalence in proportion to the addition of the viscosity-lowering agent, in case of additions beyond the point of equivalence, the solution viscosity remains nearly constant. This fact supports the theory that the viscosity-reducing agent causes a decline in the viscosity-raising action of the alkaline earth metals. Generally, in a solution of high molecular electrolytes, if the pH value of the solution is changed or suitable low molecular electrolytes are added, there are occasions when the viscosity of the solution falls. Moreover, since in this case the so-called "electroviscous effect" is weakened by changing the state of electrolytic dissociation of the polymer, it differs essentially from the mechanism of the present invention.

As is apparent from the drawing, the amount of the viscosity-lowering agent to be incorporated in the polymer solution for achieving the maximum in viscosity lowering effect must be an amount at least the equivalence, based on the alkaline earth metal salts contained in the polymer solution. This is especially true when the amount of alkaline earth metal salts contained in the solution is relatively low. For instance, when the polymer solution contains alkaline earth metal salts in an amount of about 2 milligram equivalents per 100 grams of the polymer, at least the equivalence thereof, namely, at least 2 milligram equivalents per 100 grams of the polymer of the viscosity-lowering agent must be added. However, when the polymer solution contains a relatively large amount of alkaline earth metal salts, even if the viscosity-lowering agent in an amount smaller than the equivalent of the alkaline earth metals salts is added, a sufficiently large effect of viscosity lowering can be achieved. Of course, since the lower the viscosity of the polymer solution, the more desirable it is in most respects, preferably the addition is made of the viscosity-lowering agent in somewhat excess. In practicing this invention in manufacturing operations on a commercial scale in which the amount of the alkaline earth metal salts fluctuates, it is desirable that excess addition on the order of 3 times equivalent be made. However, the use of the viscosity-lowering agent in too great an amount sometimes affects adversely the properties of the final objective product, the use of the viscosity-lowering agent in an amount in excess of 50 milligram equivalents per 100 grams of the polymer must be avoided.

The time at which the viscosity-lowering agent is added to the polymer solution may be before, at the same time, or after the polymer is dissolved in the solvent. That is, the viscosity-lowering agent can be added to either the polymer or the solvent before the polymer is dissolved in the solvent; or the polymer, solvent and the viscosity-lowering agent may be introduced concurrently into a dissolving apparatus so as to effect the dissolving of the polymer and the addition of the viscosity-lowering agent at the same time; or it is possible to add and mix in the viscosity-lowering agent after preparation of the polymer solution but before the shaping step.

As mentioned already, as the viscosity-lowering agent, oxalic acid, maleic acid, malonic acid, ethyl malonic acid, salicylic acid, orthochlorobenzoic acid, picrolonic acid, ethylenediaminetetraacetic acid, nitrilotriacetic acid, the alkali metal salts of these acids such as sodium salts and potassium salts and the ammonium salts of these acids may be used in this invention. The salts may be either neutral or acidic. Of these viscosity-lowering agents, it seems, ethylenediaminetetraacetic acid, nitrilotriacetic acid and their salts act on the alkaline earth meal salts contained in the cellulose derivative solutions, changing the latter to chelated compounds while the remaining viscosity-lowering agents have functions to change the alkaline earth metal salts to hardly soluble compounds. When said chelated compounds are used as the viscosity-lowering agents, the pH of the solution should be not be strongly acid, and is preferably either neutral or alkaline in reaction.

In carrying out the process of this invention, no special pre- or after-treatments are necessary. That is to say, the cellulose derivative may be that which is normally available commercially, which need not be washed prior to dissolving. Furthermore, the hardly soluble compound or chelated compound of alkaline earth metals, which has been formed in the solution, does not need to be removed prior to the shaping step. On the contrary, in some polymer solutions the heat stability of whose final shaped products is adversely affected if the compounds of alkaline earth metals are removed.

Upon precipitating and separating polymers from polymer solutions whose viscosities had dropped, with respect to combinations of many kinds of polymers and viscosity-lowering agents, and then having measured the intrinsic viscosities of the polymers, we found that this value was substantially the same as the original polymer. From this fact, it can be appreciated that the viscosity-lowering agent of the present invention does not lower the degree of polymerization of the polymer in the solution.

According to one of the features in particular of this invention, an acetyl cellulose solution for shaping comprising acetone-soluble acetyl cellulose, acetone, not more than 2% by weight of water based on the total solution, and 2–50 milligram equivalents based on 100 grams of said acetyl cellulose of at least one compound selected from the group consisting of oxalic acid, maleic acid, malonic acid, ethyl malonic acid, salicylic acid, orthochlorobenzoic acid, picrolonic acid, ethylenediaminetetraacetic acid, nitrilotriacetic acid, and the alkali metal salts and ammonium salts thereof is provided.

Generally the presence of water in the solution shaping of a hydrophobic polymer tends to degrade the various mechanical properties of the final shaped article. This tendency is also observed when acetyl cellulose is shaped from an acetone solution; the smaller the water content of the solution, the more excellent the mechanical properties of the shaped articles obtained. If the water contained in the solution is made 1% or less, the mechanical properties of the shaped articles improve sharply. In a particular instance, the filament of cellulose acetate prepared from a solution whose water content was 0.5%, had a tensile strength of about 10 and an elongation which was about 16% better than that of a cellulose acetate filament prepared from a solution of water content 2.5%. However, as there is a tendency for the viscosity of the solution to rise if the water content of the solution is lowered, to lower the water content to below a certain extent (about 2%) in practice makes the processing extremely difficult to carry out. In the instance given above, the spinning operation was in fact extremely difficult to carry out. On the other hand, not only was the viscosity of the spinning solution, prepared by adding a viscosity-lowering agent according to this invention to the foregoing acetone solution of acetyl cellulose (containing 0.5% by weight of moisture), lowered to an extent making it possible to use an ordinary spinning process, but also the mechanical strength of the filament obtained, when compared with that obtained from the solution whose water content was 2.5%, showed an improvement of about 15% in its tensile strength and about 28% in its elongation. It is believed that, due to the fact that the viscosity-lowering agent of this invention destroys the cross-linking bond between the chains of the polymer molecule by means of the alkaline earth metal salts and thus lowers the viscosity of the solution, not only is the viscosity of the solution rendered uniform, thereby making the shaping operation easy to perform, but also that the improvement in the orientation of chains of the polymer molecule in the solution takes place, so as to cause a synergistic effect of the viscosity-lowering agent with the changed solvent composition, as described hereinbefore.

In addition, according to this invention, a solution for shaping containing an acetyl cellulose of a higher degree of polymerization (above 200) than the conventional acetyl cellulose can be obtained, which solution can be used without difficulty with the conventional forming art to give final products of superior mechanical properties.

The solution for shaping obtained in accordance with the method of the present invention has a viscosity that is relatively low as well as uniform, and moreover, is stable. Therefore the shaping process is easily carried out, and the internal fine structure of the shaped products is uniform. Thus superior mechanical properties are ensured.

Although the methods of shaping vary widely depending upon the properties required of the product, the shape of the product and quantity produced, in all instances it is a process which comprises giving a polymer solution a given form and removing the solvent to obtain a polymeric solid. For example, in preparing a filament, the solution is extruded from a nozzle into an evaporating or coagulating medium to harden it. On the other hand, if the solution is extruded from a long, narrow slit onto a smooth, solid surface (for example, such as the surface of a metallic cylinder) or into a coagulating medium, and hardened, a film is prepared. In making a hollow container of simple shape, the mold is immersed in the solution, removed therefrom, and after effecting the hardening of the film of solution adhering to the surface of the mold, it is stripped from the mold.

Although the cellulose derivative solution of this invention can be utilized in any of the methods of solution shaping, particularly remarkable results are manifested and shaped articles having superior mechanical properties are obtained when utilized in those shaping methods in which special requirements for uniformity in the viscosity of the solution and uniformity in solvent removal during the shaping operation exist (for example, spinning and film manufacturing methods).

In order to more clearly explain the present invention, the following examples are given, it being understood that the same are merely intended in an illustrative sense and not in limitation of the invention.

*Example 1*

A 5% aqueous solution of the sodium salt of carboxymethyl cellulose (hereinafter to be represented by CMC-Na) containing 6 milligram equivalent per 100 grams thereof of alkaline earth metal salts showed a viscosity (a value measured by the falling ball method) of 1100 poises at 25° C. When to 100 grams of this solution 0.03 gram of calcium chloride was added, the viscosity of the solution became 1600 poises. In this instance, although the viscosity rose, the pH of the solution was 7.2 and showed hardly any change. The viscosity of the solution in the range above pH 4.5 remained almost constant.

To 100 grams of a 5% aqueous solution of CMC-Na containing about 6 milligrams equivalent per 100 grams thereof of alkaline earth metal salts was added 0.08 gram 8.6 mg. equivalent/100 g. of polymer) of disodium salt of ethylenediaminetetraacetic acid (hereinafter to be represented by $Na_2$-EDTA) in the form of a powder which contains 2 molecules of water of crystallization per molecule, which was then mixed and dissolved. The solution obtained had a pH of 5.2 and a viscosity of 950 poises. $Na_2$-EDTA is water-soluble and dissolves well in CMC-Na. The first step dissociation constant of ethylene-diaminetetraacetic acid at 25° C. is $1 \times 10^{-2}$, and $Na_2$-EDTA is capable of converting a greater part (about above 99%) of the alkaline earth metals in the solution into chelated compounds.

The foregoing aqueous CMC-Na solution whose viscosity is 950 poises was heated to 40° C. and was flowed down onto a rotating drum heated to 60° C., whereby a film of about 0.03 mm. in thickness was prepared. It was possible to increase the speed of rotation of the rotating drum about 15% as compared with the instance when the shaping was effected from a solution having a viscosity of 1100 poises. Also, while the film obtained from the solution having a viscosity of 1100 poises had a tensile strength of 550 kg./cm.², the product of this example showed a tensile strength of 610 kg./cm.².

*Example 2*

The commercially available acetone-soluble acetyl cellulose used in this example contained 2.5 mg. equivalent per 100 grams thereof of alkaline earth metal salts. This acetyl cellulose was dissolved in acetone (that containing 0.3% of water was used) to prepare a 20% solution thereof. This solution had a viscosity of 470 poises.

When to 100 grams of this solution 0.05 gram (about 4.0 mg. equivalent/100 grams polymer) of oxalic acid crystals were added and mixed therein, the viscosity of the solution became 300 poises. The solubility of the hardly soluble compound that was formed in this instance was about 0.01 gram/100 grams of solution. Oxalic acid, on the other hand, is readily soluble in acetone.

Using the foregoing two solutions of 470 poises and 300 poises, filaments were prepared from both by means of the dry-spinning method. Namely, after filtering and deaeration, the solution was preheated to 60° C. and then extruded through a spinneret into a spinning chamber maintained at 53° C. whereby was obtained a filament yarn of 120 denier/33 filaments.

When the spinning solution of 470 poises was used, since the viscosity was high, the fluid resistance in the spinneret was high and thus there occurred troubles during the operation. The filament yarn obtained had a tensile strength of 1.25 grams/denier and a break elongation of 30%. On the other hand, when the spinning solution according to the present invention was used, the fluid resistance was low and the operation ran very smoothly. And the yarn obtained had a tensile strength of 1.36 gram/denier and a break elongation of 35%.

*Example 3*

The commercially available acetyl cellulose used in Example 2 was prepared into a solution having the following composition:

| | Parts |
|---|---|
| Acetyl cellulose | 22 |
| Acetone | 75 |
| Water | 3 |

The viscosity of this solution was 500 poises. This solution was preheated to 50° C., flowed over a rotating drum heated to 50–60° C., and then the solvent was evaporated, whereby a film 0.035 mm. in thickness was prepared. This film had a tensile strength of 10.3 kg./mm.$^2$ and a break elongation of 35%.

Using the same acetyl cellulose, a solution was prepared whose composition including a viscosity-lowering agent was as follows:

| | Parts |
|---|---|
| Acetyl cellulose | 22 |
| Acetone | 77.25 |
| Water | 0.75 |
| Oxalic acid | [1] 0.03 |

[1] 3 m. eq./100 g. of polymer.

This solution showed the same viscosity as in the foregoing solution notwithstanding its lesser water content. Under completely identical conditions as above, a film having a thickness of 0.035 mm. was prepared from this solution. The tensile strength of this film was 11.5 kg./mm.$^2$ and its break elongation was 43%.

*Example 4*

In the acetyl cellulose solution containing oxalic acid, as described in Example 2, there were dispersed a minute quantity of particles of a hardly soluble substance. A part of this solution was filtered several times with a fine-textured filter paper to remove the aforementioned particles. Then this solution was cast on to a smooth plate glass and the solvent was evaporated at room temperature, whereby was prepared a film 0.1 mm. in thickness. The other part of the above solution, without being filtered, was likewise cast and the solvent was evaporated whereby was prepared likewise a film 0.1 mm. in thickness.

When these two kinds of films were placed between chromium-plated steel plates heated at 180° C. and allowed to stand thus for 3 minutes, the film cast from the solution from which the particles were removed was colored a light brown color, while that cast from the solution from which the particles were not removed was colorless.

*Example 5*

The solution of the following composition showed a viscosity of 2,370 poises, and it was unstable and tended to gel easily.

| | Parts |
|---|---|
| Triacetyl cellulose (containing 8 mg. eq. of alkaline earth metal salts/100 g.) | 20 |
| Methylene chloride | 72 |
| Methanol | 8 |

When dissolving the foregoing solution, if 0.24 part (20.6 mg. equivalent/100 grams polymer) of maleic acid having a dissociation constant at 25° C. of $1.4 \times 10^{-2}$ was added in powdered form, the viscosity of the polymer solution dropped to 1,020 poises. And even though this solution was left to stand for a period of one week, it did not gel. In this case, the hardly soluble compound that was formed by the reaction of alkaline earth metal salts and maleic acid had a solubility with respect to the solution of 0.11 gram/100 grams of solution.

After deaeration, the solution was extruded through a spinneret into a spinning cell to obtain filaments, the tensile strength of which was 1.15 grams/denier and the elongation of which was 27%. Furthermore, this filament began to discolor and soften at 220–230° C.

*Example 6*

Using the commercially available acetyl cellulose (acetic acid value 54.2%, polymerization degree 178, ash content 0.07%, alkaline earth metal salts 2.2 gm. eq./100 g.), two kinds of spinning solutions A and B of following composition were prepared:

| Spinning solution | A | B |
|---|---|---|
| Polymer (Percent) | 25 | 25 |
| Water (Percent) | 0.4 | 2.4 |
| Oxalic acid (Percent based on polymer) | 0.15 | 0 |
| Viscosity (Poises at 25° C.) | 1,750 | 1,510 |

Using these spinning solutions, filament yarns of 100 denier/25 filaments were prepared by the conventional dry-spinning process.

The dry tensile strength and dry elongation of these yarns were as follows:

| Spinning solution | A | B |
|---|---|---|
| Dry tensile strength (g./de.) | 1.43 | 1.31 |
| Dry elongation (Percent) | 36 | 29 |

*Example 7*

By dissolving in acetone acetyl cellulose flakes (acetyl value 39.3%, polymerization degree 260, alkaline earth metal salts 2.7 mg. eq./100 g.), a spinning solution such as follows was prepared:

| | |
|---|---|
| Acetyl celluose concentration | percent 20.0 |
| Water content | do 0.5 |
| Oxalic acid (based on the flakes) | do 0.1 |
| Falling ball viscosity | poises 1750 |

This spinning solution was dry-spun in accordance with the spinning steps used in case of a conventional spinning solution whereby was prepared a yarn of 75 denier/30 filaments.

The results of comparisons made between the tensile strength and elongation of this yarn with that of the commercially available diacetate yarn (75 denier/20 filaments) are shown below:

| | Acetate Yarn Prepared from Above Spinning Solution | Commercially Available Acetate Yarn |
|---|---|---|
| Dry tensile strength (g./de.) | 1.82 | 1.27 |
| Dry elongation (Percent) | 28.8 | 28.9 |
| Wet tensile strength (g./de.) | 1.25 | 0.81 |
| Wet elongation (Percent) | 37.7 | 39.2 |
| Dry knotted strength (g./de.) | 1.41 | 1.20 |
| Dry yield strength (g./de.) | 0.80 | 0.65 |

Again, when the yarn prepared from the spinning solution according to this invention was woven into various kinds of fabrics and tests were made, it was observed that these fabrics were stronger than the conventional diacetate fabrics in that they were superior in tear strength by 30–60%, in surface abrasion strength by 150–300% as well as excelling in resistance to heat.

Example 8

A 15% aqueous solution of ethyl cellulose containing 10 milligram equivalents per 100 grams of the polymer of an alkaline earth metal salts shows a viscosity of 630 poises.

When to 100 parts of this solution was added 0.31 part (13 milligram equivalents/100 grams of the polymer) of sodium salicylate and the mixture was well stirred, the viscosity of the mixed solution lowered to 310 poises, the mixed solution showing very good fluidity.

When said mixed solution was filtered and the foam of which removed, a thin film having no fish eye could be made efficiently by casting.

Example 9

Ethyl cellulose same as that used in Example 8 was dissolved in hard water (hardness: 40), the resultant 15% aqueous solution showing a viscosity of 860 poises. The amount of the alkaline earth metal salts contained in said hard water was 8.1 milligram equivalents/100 grams of the polymer. Accordingly, the total amount of the alkaline earth metal salts contained in said aqueous solution was 18.1 milligram equivalents/100 grams of the polymer. When to 100 parts of this aqueous solution, 2.0 parts (50 milligram equivalents/100 grams of the polymer) of disodium nitrilotriacetate were added, the viscosity became 360 poises.

In this case, when the amount of disodium nitrilotriacetate added was reduced to 1.6 parts (40 milligram equivalents/100 grams of the polymer), the viscosity became 380 poises.

Example 10

A 20% by weight solution of commercially available cellulose acetate butyrate containing 4.5 milligram equivalents/100 grams of the polymer of alkaline earth metal salts in 80 parts of acetone, 10 parts of propyl alcohol and 10 parts of ethyl acetate shows a viscosity of 420 poises.

When to 100 parts of this solution 0.16 part (5 milligram equivalents/100 grams of the polymer) of orthochlorobenzoic acid was added, the viscosity became 320 poises.

By lowering of the viscosity, the time for removing foams of the solution was shortened by 40%, whereas the filtering velocity could advance by 25%.

When said solution was used for casting of film, because its fluidity was better than that of the conventional solution, the unevenness of thickness of the resultant film and the occurrence of spots and fish eye of the resultant film decreased remarkably.

Example 11

A 20% acetone solution of cyanoethyl cellulose containing 6 milligram equivalents/100 grams of the polymer of alkaline earth metal salts shows a viscosity of 1120 poises.

When to 100 parts of this solution 0.34 part (12 milligram equivalents/100 grams of the polymer) of ammonium malonate was added, the viscosity became 670 poises.

Said solution was pre-heated to 65° C., extruded to air heated to 70° C. through a spinning nozzle whereby it was dry-spun.

In the case of using said solution, the operational stability was better than in the case of using the conventional solution having a high viscosity, moreover, yarn cutting and nozzle closing decreased to $\frac{1}{5}$–$\frac{1}{10}$.

Example 12

A 50% concentration solution of acetyl cellulose containing 2.5 milligram equivalents/100 grams of the polymer of alkaline earth metal salts dissolved in a mixed solvent of 80 parts of acetone, 10 parts of propyl alcohol and 10 parts of ethyl acetate shows a viscosity of $4.0 \times 10^4$ poise at 50° C.

When to 100 parts of this solution was added 0.32 part (3.5 milligram equivalents/100 grams of the polymer) of ethyl malonic acid, the viscosity became $3.2 \times 10^4$.

When said solution was extruded through an extruder whereby a monofilament of 1000 denier was dry-spun, due to its low viscosity, the extruding power could be reduced by 30%, moreover, the surface of extruded monofilament was very smooth.

Example 13

A 20% aqueous solution of hydroxyethyl cellulose containing 48 milligram equivalents/100 grams of the polymer of alkaline earth metal salts showing a somewhat turbid jelly state, even when heated fine jelly particles remained and could not be used as a solution for shaping. Its viscosity becoming above tens of thousands poise and could not be measured.

Upon dissolving this solution, to 100 parts thereof 2.1 parts (50 milligram equivalents/100 grams of the polymer) of ammonium maleate being added, then the turbidity increased, however, the viscosity lowered to 2000 poises, becoming shapeable.

Example 14

A 50% acetone solution of acetyl cellulose containing 50 milligram equivalents/100 grams of the polymer of alkaline earth metal salts becoming a jelly state as a whole, showing properties similar to those of a solid, even when heated to about 100° C. jelly particles remained, therefore, the stable shaping thereof could not be carried out, moreover, the surface of the resultant shaped article was not smooth.

Upon making this solution, to 100 parts thereof 1.15 parts (50 milligram equivalents/100 grams of the polymer) of oxalic acid being added, then the viscosity of the solution decreased to $5.0 \times 10^4$ at 50° C. When said solution was heated to 60° C. and shaped by extrusion, a bristle whose surface being smooth could be obtained.

Example 15

When to the 50% solution of acetyl cellulose of Example 14 was added small amount of water, the water content thereof being made 2%, the viscosity of the solution decreased somewhat. When too much water was added thereto, the toughness of the product lowered, it being undesirable. When the water content of the solution was made 2%, a 50% concentration jelly became somewhat softer, yet it could not be used for shaping.

However, when to 100 parts of said solution were added 1.15 parts (50 milligram equivalents/100 grams of the polymer) of oxalic acid, the viscosity of the solution decreased to $3.6 \times 10^4$ at 50° C., and when heated to 60°

C. and extruded, a stable shaping could be carried out.

This application is a continuation-in-part of the applicants' copending application Serial No. 218,793, filed Aug. 22, 1962.

Having thus described the nature of the invention, what is claimed is:

In a process for the preparation of a acetyl cellulose solution for shaping, the improvement which comprises adding from 2-50 milligrams equivalents based on 100 grams of said acetyl cellulose a compound selected from the group consisting of ethylene diaminetetraacetic acid, oxalic acid, maleic acid, picrolonic acid, salicyclic acid, nitrilotriacetic acid, orthochlorobenzoic acid, malonic acid, ethyl malonic acid and the alkali metal salts and ammonium salts thereof, to a solution containing 5 to 60% by weight of acetyl cellulose dissolved in acetone and from 0.3% to not more than 2% by weight of water, said acetyl cellulose containing from 2 to 50 milligram equivalents of alkaline earth metal salts based on 100 grams of acetyl cellulose.

References Cited

UNITED STATES PATENTS 2,872,231 2/1959 Grady _____ 106—178
2,966,422 12/1960 Brandner _____ 106—178

JULIUS FROME, *Primary Examiner.*